July 10, 1923.

W. T. MORRIS

AUTOMOBILE BUMPER

Filed Nov. 4, 1922

1,461,431

William T. Morris
Inventor

By Frederick S. Duncan
Attorney

Patented July 10, 1923.

1,461,431

UNITED STATES PATENT OFFICE.

WILLIAM T. MORRIS, OF BROOKLYN, NEW YORK, ASSIGNOR TO AMERICAN CHAIN COMPANY, INC., A CORPORATION OF NEW YORK.

AUTOMOBILE BUMPER.

Application filed November 4, 1922. Serial No. 598,978.

*To all whom it may concern:*

Be it known that I, WILLIAM T. MORRIS, a citizen of the United States, residing in the borough of Brooklyn, city of New York, State of New York, have invented certain new and useful Improvements in Automobile Bumpers, of which the following, taken in connection with the accompanying drawing, is a specification.

My invention relates to improvements in automobile bumper bars and has for one of its objects to provide a new and improved type of bumper bar in which two reinforcing spring strips one above the other are employed and which while strong is capable of being made particularly light and is adapted to yield in every direction by merely flexing.

Other objects of my invention will appear in the description thereof.

Referring to the drawings.

Figure 1:
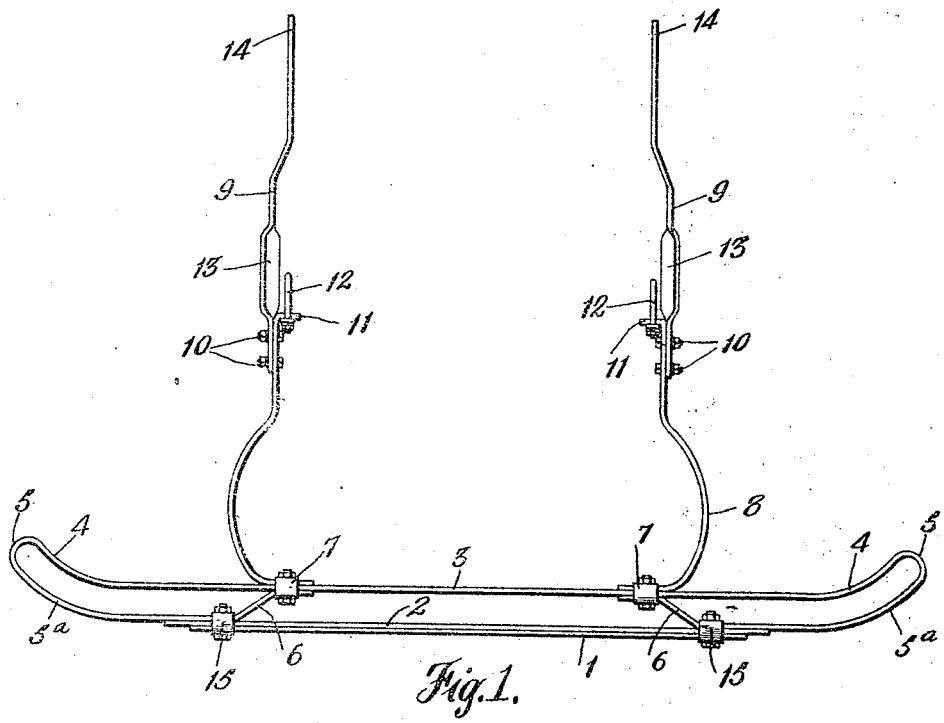
Fig. 1 is a plan view of the bumper.
Figure 2:
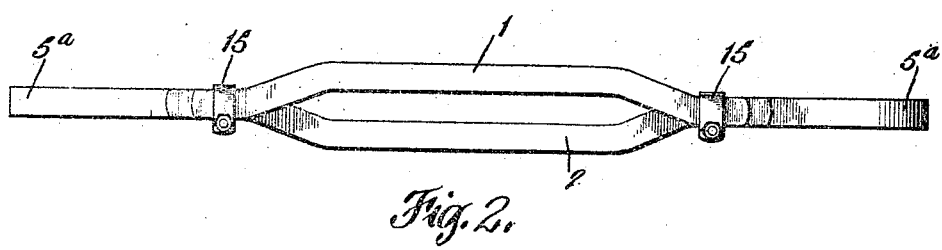
Fig. 2 is a front elevation thereof.

The central impact receiving portion of the bumper consists of two spring strips 1 and 2 preferably so disposed that one of them extends upwardly and the other downwardly from the horizontal medial plane of the bumper with the result that an additional area of protection is afforded for the more vital and fragile parts of an automobile to which the bumper may be attached. These two strips are sustained and held in proper position by a member consisting of the rear bar 3 which is curved slightly rearwardly at both ends, as at 4, and then reversely curved as at 5 and continued as shown at 5ª substantially parallel with the rear bar to points substantially in line with the side members of an ordinary automobile chassis, whence the two ends are brought back to the rear bar on a diagonal as at 6 meeting the rear bar and being clamped thereto by the clips 7. The clips 7 may also serve to clamp the bumper to the supporting arms which are preferably slightly outwardly curved as at 8. The supporting arms continue rearwardly and are jointed to the member 9 by any convenient means such as the bolts 10. The supporting arms 8 terminate in abutments 11 which serve to abut against the front of the chassis more particularly that of the well known Ford car. U-bolts 12 serve to support the arms to the chassis. The members 9 are turned to a diagonal as at 13 which are adapted to underlie the lamp supporting brackets of the car of the Ford type, and the extreme end portions 14 may be attached to the side members by any convenient means. The central impact receiving members are clamped against the rear members by the clips 15.

Having thus described my invention I claim:

1. A bumper for automobiles comprising two central impact receiving members one extending above and the other below the medial plane of the bumper, and a rear bar curved slightly rearwardly at both ends and then reversely curved to continue parallel with itself, the two ends then continuing diagonally to meet the said rear bar, and means for clamping the several parts together.

2. A bumper for automobiles comprising two central impact receiving members one extending above and the other below the medial plane of the bumper, and a rear bar curved slightly rearwardly at both ends and then reversely curved to continue parallel with itself, the two ends then continuing diagonally to meet the said rear bar, means for clamping the several parts together and supporting arms for said bumper, said arms consisting of flat strip material bowed slightly outwardly.

3. A bumper for automobiles formed of strip material comprising two central impact receiving members one extending above and the other below the medial plane of the bumper, and a rear bar curved slightly rearwardly at both ends and then reversely curved to continue parallel with itself, the two ends then continuing diagonally to meet the said rear bar, and means for clamping the several parts together.

In testimony whereof I have signed this specification.

WILLIAM T. MORRIS.